(12) United States Patent
Williams et al.

(10) Patent No.: US 7,766,748 B2
(45) Date of Patent: Aug. 3, 2010

(54) METHOD OF INTERFACING ON A COMPUTER NETWORK BY VISUAL REPRESENTATION OF USERS, METHOD OF INTERACTING AND COMPUTER NETWORK

(75) Inventors: Kenneth A. Williams, Bass Lake, CA (US); David R. Slayback, Oakhurst, CA (US); Matthew D. George, Coarsegold, CA (US); Jeffrey A. Stephenson, Ahwahnee, CA (US)

(73) Assignee: AOL Inc., Dulles, VA (US)

( * ) Notice: Subject to any disclaimer, the term of this patent is extended or adjusted under 35 U.S.C. 154(b) by 1619 days.

(21) Appl. No.: 10/734,192

(22) Filed: Dec. 15, 2003

(65) Prior Publication Data

US 2004/0125135 A1 Jul. 1, 2004

Related U.S. Application Data

(63) Continuation of application No. 08/149,026, filed on Nov. 8, 1993, now Pat. No. 6,692,359, which is a continuation of application No. 07/656,292, filed on Feb. 15, 1991, now abandoned.

(51) Int. Cl.
*A63F 13/00* (2006.01)
(52) U.S. Cl. .......................................... 463/42; 463/29
(58) Field of Classification Search ................... 463/29, 463/42; 434/362
See application file for complete search history.

(56) References Cited

U.S. PATENT DOCUMENTS 3,701,971 A * 10/1972 Sanner et al. ............... 709/224

| | | |
|---|---|---|
| 3,753,234 A | 8/1973 | Gilbert et al. |
| 3,910,322 A | 10/1975 | Hardesty, Jr. et al. |
| 4,045,789 A | 8/1977 | Bristow |
| 4,063,220 A | 12/1977 | Metcalfe et al. |
| 4,126,851 A | 11/1978 | Okor |
| 4,274,139 A | 6/1981 | Hodgkinson et al. |

(Continued)

FOREIGN PATENT DOCUMENTS

JP 6096059 5/1985

OTHER PUBLICATIONS

Bowen et al., "How to get the most out of CompuServe 4th Edition", Bantam Books/Feb. 1989, pp. include 94-95, 207-209, 381.*

(Continued)

*Primary Examiner*—Peter DungBa Vo
*Assistant Examiner*—David Duffy
(74) *Attorney, Agent, or Firm*—Finnegan, Henderson, Farabow, Garrett & Dunner, LLP

(57) ABSTRACT

A method of interfacing used on a network having a central computer system and a plurality of remote computer systems is provided. Each remote computer system includes a video display. Applied to video games, the method creates a first visual representation of a first player on a first remote computer system, identifies an interest and a skill level of the first player for at least one video game, indicates predetermined personal characteristics of the first player, saves the visual representation, interest, skill levels and personal characteristics of the first player, accesses the central computer system from the first remote computer system, selects a second player who has accessed the central computer system from a second remote computer system, and invites the second player to play a selected video game. The second player may access the visual representation, interest, skill levels and personal characteristics of the first player.

38 Claims, 3 Drawing Sheets

U.S. PATENT DOCUMENTS

| | | | |
|---|---|---|---|
| 4,414,621 A | | 11/1983 | Bown et al. |
| 4,521,014 A | * | 6/1985 | Sitrick ........................ 463/31 |
| 4,570,930 A | | 2/1986 | Matheson |
| 4,572,509 A | | 2/1986 | Sitrick |
| 4,752,069 A | | 6/1988 | Okada |
| 4,856,787 A | | 8/1989 | Itkis |
| 4,974,173 A | * | 11/1990 | Stefik et al. ................. 715/751 |
| 4,987,492 A | * | 1/1991 | Stults et al. ............. 348/14.08 |
| 5,083,271 A | * | 1/1992 | Thacher et al. ............... 700/92 |
| 5,083,800 A | * | 1/1992 | Lockton ..................... 463/42 |
| 5,107,443 A | | 4/1992 | Smith et al. |
| 5,111,409 A | | 5/1992 | Gasper et al. |
| 5,119,319 A | * | 6/1992 | Tanenbaum ................. 709/205 |
| 5,195,086 A | * | 3/1993 | Baumgartner et al. ....... 370/264 |
| 5,347,632 A | * | 9/1994 | Filepp et al. ................ 709/202 |

OTHER PUBLICATIONS

Brittin, Ruth V., Ph.D., The effect of categorization on preference for popular music styles. The Florida State University, 1989, p. 72.*

Fontecilla, Rodrigo. games. In net.chess [online]. Jul. 1, 1985; 13:33 [retrieved on Nov. 5, 2009]. Retrieved from the Internet: <URL: http://groups.google.com/group/net.chess/browse_thread/thread/2b05e5ec36816d4c/4e788b65581c31f0?I>.*

Chess Tournament Listings: How to better understand them [online] [retrieved on Nov. 10, 2008]. Retrieved from the Internet: <URL: http://web.archive.org/web/20010410031431/chesstour.com/getmost.html>.*

Bowen et al., "How to get the most out of CompuServe 4th Edition," Bantam Books/Feb. 1989, pp. include 71-75, 365-390, 214, 188-248, 106-118, 94, 95, 207-209, 381, 409, 410.

Glossbrenner, "Glossbrenner's Master Guide to Genie," Osbourne McGraw-Hill, 1991, pp. include 5, 9, 10, 42-44, 157-162 and 343-400.

Lichy et al., "The Official America Online Membership Kit and Tour Guide PC Edition V 1.5," Ventana Press 1992, pp. include 70-74, 89-95, 169, 170, 233-256, 311-313, 329.

'An Al Lowe Bio,' 'Disk-o-graphy,' and 'Leisure Suit Larry 4' from Al Lowe's Humor Site, [http://www.allowe.com] accessed Apr. 5, 2002.

"Facemaker" Spinnaker software 1984, review of software by Phil Shapiro, from [http://nitros9.stg.net/facemaker.htm] accessed Apr. 3, 2002.

Weyhrich, "Apple II History," 'Telecommunications' from [http://apple2history.org/history/ah22:html] pp. 1-19, accessed Feb. 19, 2003.

Evans, Al, "Remember Q-Link" from [http://www.qlinklives.org/Memories/Remember_Q-Link/remember_q-link.html] accessed Apr. 3, 2002.

Farmer, "First use of AVATAR," from MUD_Dev mailing list, [http://www.kanga.nu/archives/MUD-Dev-L/2002Q1/msg00011.php] accessed Apr. 3, 2002.

Description of Q-Link from [http://inconnu.isu.edu/~ink/new/links/computing/qlink].

Morningstar et al., "The Lessons of Lucasfilm's Habitat," Cyberspace:First Steps, MIT Press, 1990.

Description/QuantumLink Uswer's Guide from [http://www.astralight.com/c64/qlink_ug.html].

MacWorld, Apr. 1990, pp. 167, 168, 170 and 172; review of software for 'America Online' and 'Prodigy 1.0'.

Conhaim, Wallys, "Apple Enters Videotex business with Consumer Service," Information Today, pp. 13, 16, 18, Jun. 1998.

Risch, R., "Knights on the Roundtable: Spotlight Genie," Link-up, pp. 20, 21, 24, Dec. 1991.

Webb, J., "Quantum Unveils Online System for PC Owners," Link-up, pp. 1, 31, 32, Feb. 1989.

O'Leary, M., "Genie Savors Videotex Success," Link-up, p. 15, Aug. 1988.

"Linking up to Apple and Others," Classroom Computer Learning, p. 66, Sep. 1988.

Stefik et al., WYSIWIS Revised: Early Experiences with Multiuser Interfaces, ACM Transaction on Office Information System, vol. 5, No. 2, Apr. 1987, pp. 147-167.

Sarin et al., Computer-Based Real-Time Conferencing Systems, IEEE Computer, Oct. 1985, pp. 33-45.

Foster, Gregg, Collaborative Systems and Multi-User Interfaces,, Oct. 31, 1986.

* cited by examiner

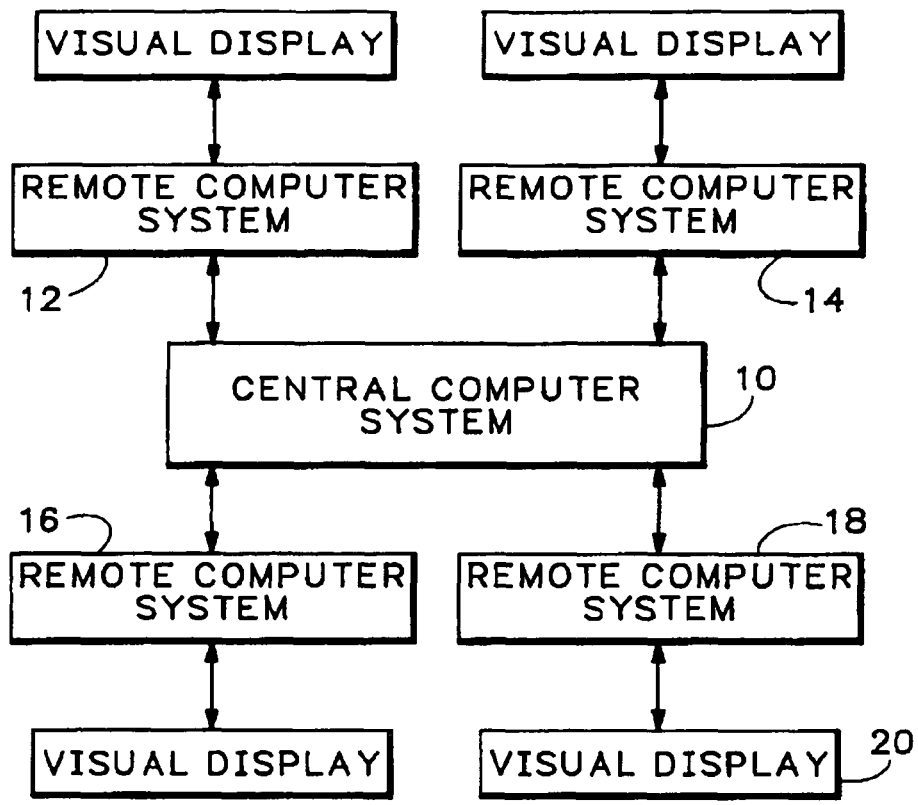
FIG.1
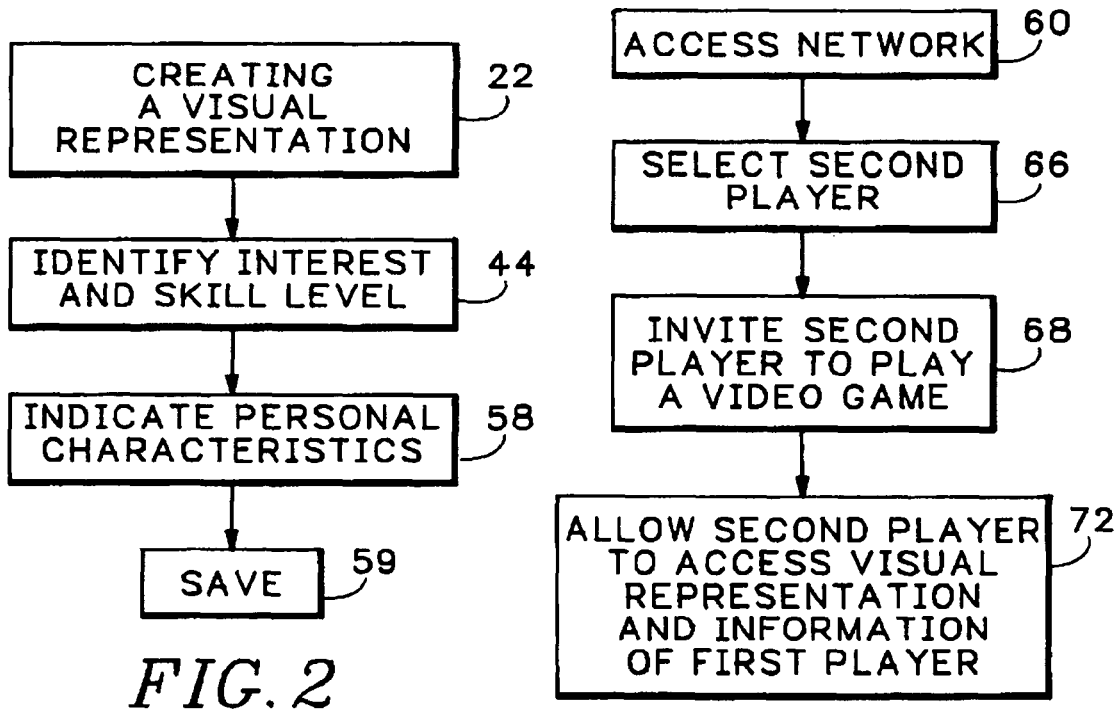
FIG.2
FIG.3

METHOD OF INTERFACING ON A COMPUTER NETWORK BY VISUAL REPRESENTATION OF USERS, METHOD OF INTERACTING AND COMPUTER NETWORK

This application is a continuation of U.S. application Ser. No. 08/149,026, filed Nov. 8, 1993, and titled METHOD OF INTERFACING ON A COMPUTER NETWORK BY VISUAL REPRESENTATION OF USERS, METHOD OF INTERACTING AND COMPUTER NETWORK, now U.S. Pat. No. 6,692,359, which is a continuation of U.S. application Ser. No. 07/656,292, filed Feb. 15, 1991, and titled METHOD OF INTERFACING ON A COMPUTER NETWORK BY VISUAL REPRESENTATION OF USERS, METHOD OF INTERACTING AND COMPUTER NETWORK, now abandoned, all of which are hereby incorporated by reference in their entirety for all purposes.

TECHNICAL FIELD

This invention relates to interfacing on a computer network and more particularly to the display of visual representations of users on video displays of a computer network.

BACKGROUND ART

A computer network is a plurality of computer systems interconnected by communication channels. For example, a central computer system may interconnect numerous remote computer systems. Each remote computer system can communicate with the other systems through the central computer system. Often, the communication channels are telephone lines. Thus, a computer operator at one location can access a computer operator at another location by both operators accessing a central computer system over telephone lines.

Computer networks are used for a variety of purposes, for example, to send messages from one point to another. They can also allow numerous people to access a database or a document. Additionally, networks can be used to play video games.

This invention provides a method of interfacing between computer systems on a network. Interfacing means simply to communicate between computer systems on the network. This invention also provides a method of interacting between different computer systems on a network and it provides an invented computer network.

DISCLOSURE OF THE INVENTION

The invented method of interfacing is used on a network having a central computer system and a plurality of remote computer systems. Each remote computer system includes a video display. The method includes the steps of creating a first visual representation of a first user on the visual display of the first computer system and a second visual representation of a second user on the visual display of the second computer system. The second visual representation is then displayed on the visual display of the first computer system and the first visual representation is displayed on the video display of the second computer system.

The invented method of interfacing can be expressed differently as creating a first visual representation of a first user on a first remote computer system, accessing the central computer from the first remote computer system, selecting at least one other user who has accessed the central computer system through a second remote computer system, and inviting the other user to employ an application, where the step of inviting allows the other user to view the first visual representation on the video display of the second remote computer system.

The invented method, applied to video games, includes the steps of creating a first visual representation of a first player on a first remote computer system, identifying an interest and a skill level of the first player for at least one video game, indicating predetermined personal characteristics of the first player, saving the visual representation, interest, skill levels and personal characteristics of the first player, accessing the central computer system from the first remote computer system over telephone lines, selecting a second player who has accessed the central computer system from a second remote computer system and inviting the second player to play a selected video game. The step of inviting allows the second player to access the visual representation, interest, skill levels and personal characteristics of the first player.

The invented method of interacting is used on a network having a central computer system and a plurality of remote computer systems. Each remote computer system is operated by a user and has access to at least one predetermined application program. The method includes the steps of employing one of the predetermined application programs by at least two primary users. The step of employing results in an action of the predetermined application program. A different user is then allowed to watch the action of the predetermined application program as it is employed by the primary users.

The invented computer network includes a central computer system, a plurality of remote computer systems connected to the central computer system over telephone lines, means for creating visual representations of users on the visual displays of the remote computer systems, means for sending the visual representation of a user from one remote computer system to a predetermined number of other remote computer systems, and means for running an application program between users of different remote computer systems.

BRIEF DESCRIPTION OF THE DRAWINGS

FIG. 1 is a block diagram of a computer network.

FIGS. 2 and 3 are flow charts outlining several steps of the invented method of interfacing.

DETAILED DESCRIPTION AND BEST MODE FOR CARRYING OUT THE INVENTION

Figure 4:
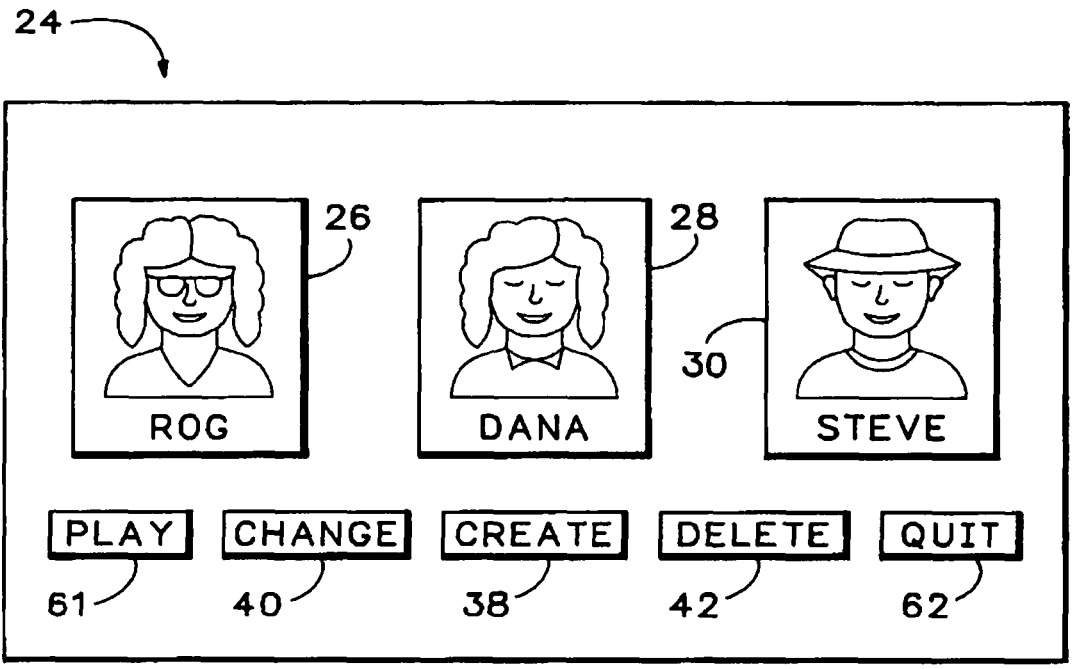
FIGS. 4 through 7 show various displays that can be presented on the visual display of a computer system employing the invented methods.

FIG. 1 shows a computer network having a central computer system 10 interconnected with several remote computer systems 12, 14, 16 and 18. The computer network is often a wide-area network and the central computer system acts as a database server or smart switch that makes connections between the appropriate remote computer systems. Each remote computer system includes a visual display such as visual display 20 associated with remote computer system 18, and each remote computer system can communicate with one or more of the other remote computer systems through the central computer system. The remote computer systems and the central computer system can be interconnected with dedicated lines or, as is often the case, by switched or dial-up telephone lines. If the remote computer systems and the central computer system are interconnected by telephone lines, then each computer system would include a modem and each remote computer system would communicate through the central computer system over the modems as is known in the art. The central computer system may include any known method of recognizing the remote computer systems.

In a typical network, the remote computer systems will be MS-DOS-based personal computers with VGA monitors running at approximately 12 MHz or greater. The invention is however applicable to all types of computer systems including Apple Macintosh computers and Amiga computers. The central computer system can be any type of system, including a PC/AT system running under extended DOS or UNIX at 25 MHz.

The invented method of interfacing between remote computer systems can be implemented on the network discussed above. In essence, the invented method interfaces by displaying graphical representations of the users of the computer network on the various visual displays of the remote computer systems. Thus, each user of a remote computer system can see a representation of the users of the other remote computer systems. The invented method of interfacing is applicable on a network with any given number of remote computer systems and any given number of users.

From another perspective, the invented method of interfacing creates a first visual representation of a first user on a first remote computer system. It then accesses the central computer system from the first remote computer system and selects at least one other user who has accessed the central computer system from a second remote computer system. The method then allows the first user to invite the other user to employ an application, such as play a video game, where the step of inviting allows the other user to view the first visual representation on the video display of the second remote computer system. In most cases, the other user will have created a second visual representation of the other user on the second remote computer system and the first user can view the second visual representation on the video display of the first remote computer system.

The invented interfacing method is particularly applicable on networks designed for playing video games. Specifically, a first user at one location may play a video game with a second user at a second location on a network. Alternatively, several users at different locations may play a video game together. The invented method allows the different players to see representations of and to learn of the personal interests of the different players.

FIGS. 2-7 illustrate a preferred video game network embodying the invented method. Specifically, FIGS. 2 and 3 are flow charts outlining steps of the invented method and FIGS. 4-7 illustrate different displays that may be shown on a video display of a remote computer system while the invented method is employed.

In the preferred video game network, a user must create a visual representation of himself or herself before playing a game. That step is illustrated by block 22 in FIG. 2.

FIG. 4 shows at 24 a simplified screen display shown on the video display of a first remote computer system. It includes three visual representations 26, 28 and 30 of three different people. Each one of those three people may use the first remote computer system.

Figure 5:
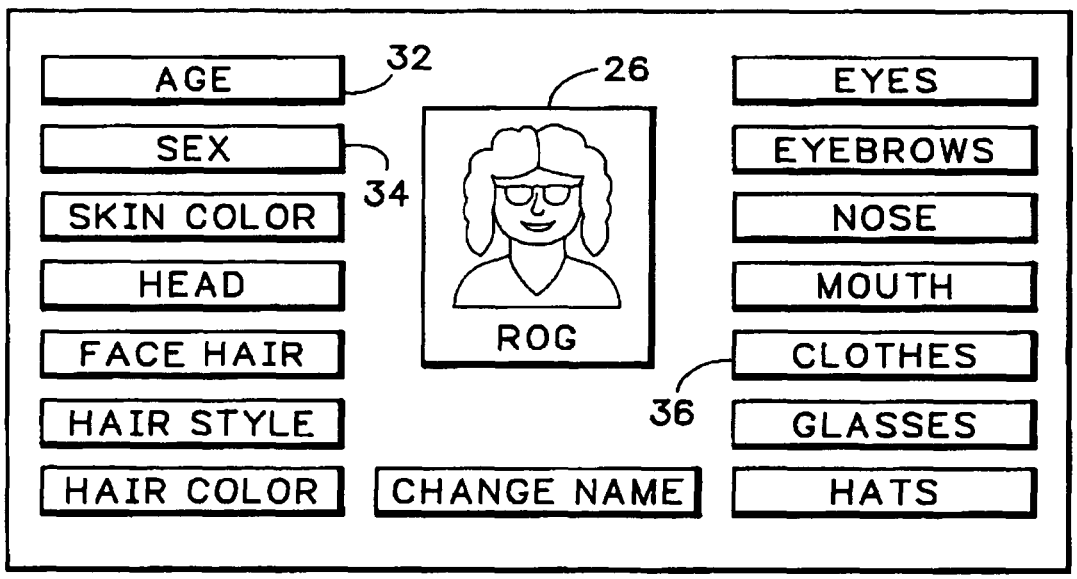

Each of the visual representations 26, 28 and 30 were created by software that allows a user to select predetermined characteristics stored it memory accessible by the first remote computer system, and then combine the predetermined characteristics to create the visual representation. In FIG. 5, visual representation 26 is displayed surrounded by the names of different characteristics, such as the names identified at 32, 34 and 36. Each of the named characteristics may include a library of different images. For example, characteristic 32 is "AGE". By accessing that characteristic, a user can view different faces having different ages. Similarly, a user can select different characteristics from those stored under each name. The selected characteristics can be combined to create a visual representation such as visual representation 26. Typically, the different characteristics would be stored in an electronic memory device accessible by the first remote computer system. Each predetermined characteristic may comprise a pixel (picture element) pattern which can be displayed on a video display in a computer system as is known in the art. Additionally, the resulting visual representation can be named, just as visual representation 26 is name "ROG".

Each visual representation is a composite of different characteristics selected by a user. Thus, a visual representation can resemble a user or it can look completely different from a user. That feature allows a user to decide what visual representation others see. Alternatively, a photograph of a user can be scanned and digitized and used as the visual representation. That process, however, requires more data to recreate the visual representation than combining different predetermined characteristics. Accordingly, the amount of data that can be transmitted over the network may dictate the way the visual representation is created.

Any method of displaying and combining predetermined characteristics can be used to create the visual representation. Block 38 in FIG. 4 represents software capable of creating the visual representations. When a user selects block 38, that software is accessed. Box 40 in FIG. 4 allows a user to edit or change a visual representation. Box 42 allows a user to delete a visual representation. The phrase "means for creating visual representations of users on visual displays of the remote computer system" may include software as described above.

After a user has created a visual representation, the user can then identify an interest level and a skill level in various video games. That step is illustrated at 44 in FIG. 2.

Figure 6:
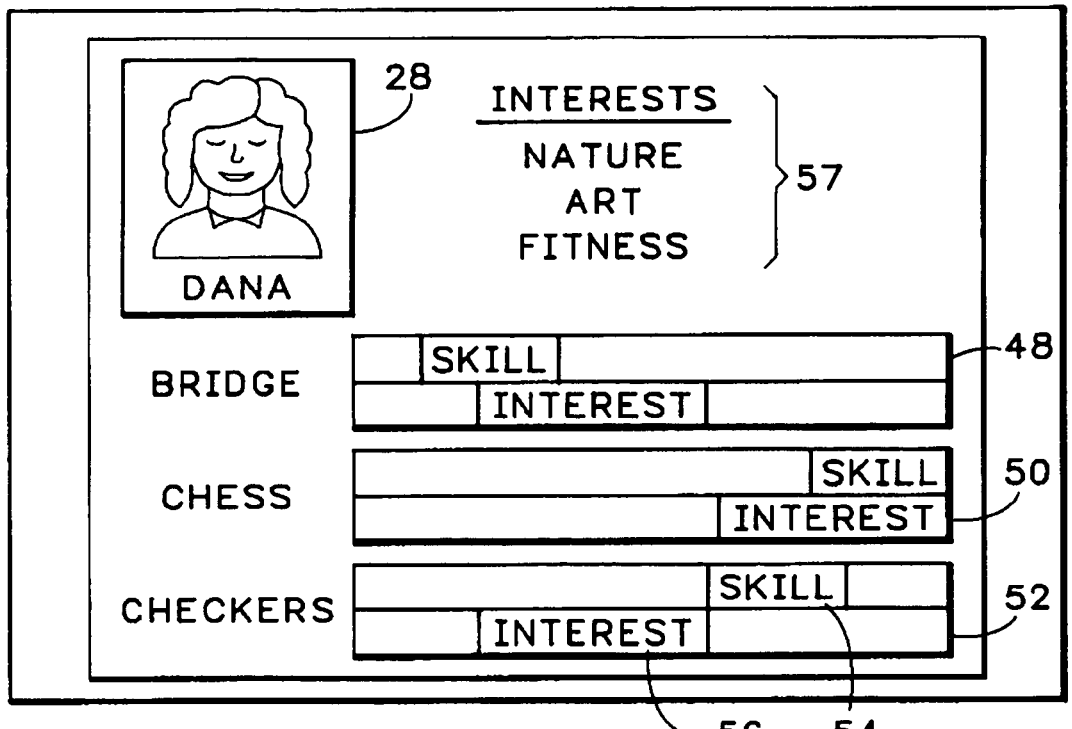

FIG. 6 illustrates a display on a video display of a remote computer system that includes visual representation 28. As explained, visual representation 28 shows a user of a remote computer system.

If the computer network is designed for playing video games, that person can then indicate his or her skill and interest levels in the different games available on the computer network. That is shown in FIG. 6 by bar graphs 48, 50 and 52. Bar 48 shows the skill and interest of the person depicted in visual representation 28 for the game bridge. Similarly, bar 50 is for the game chess and bar 52 is for the game checkers. The left end of the bars represents little skill or interest and the right end indicates great skill or interest. The positions between the ends indicate intermediate skill and interest levels. Markers, such as markers 54 and 56 can be positioned on the bar graphs to give an indication of the user skill and interest.

Various interests of the person identified by visual representation 28 can be shown at 57. In other words, a user of the invented method can list his or her interests and hobbies, such as shown at 57 in FIG. 6. In this way, a user can communicate personal information and characteristics to other users. This step is represented by step 58 in FIG. 2.

Thus, the invented method allows for a user of a computer network to identify himself or herself by a visual representation and by communicating personal characteristics. Obviously, other means of displaying personal characteristics and skill and interest levels can be used. Additionally, the order of steps 22, 44 and 58 in FIG. 2 can be changed.

After a user has created a visual representation and listed any interests, skill levels or characteristics, all the information is saved in memory accessible by the remote computer system, as represented by block 59 in FIG. 2. Alternatively, the information can be saved by the central computer system.

When a user wants to play a video game or run an application on the computer network, the user first accesses the network as shown at step 60 in FIG. 3. Again, the network can be accessed by any known means. The display shown in FIG. 4 shows a block 61 which the user may select to access the network. Similarly, block 62 may be selected to exit the network.

Figure 7:
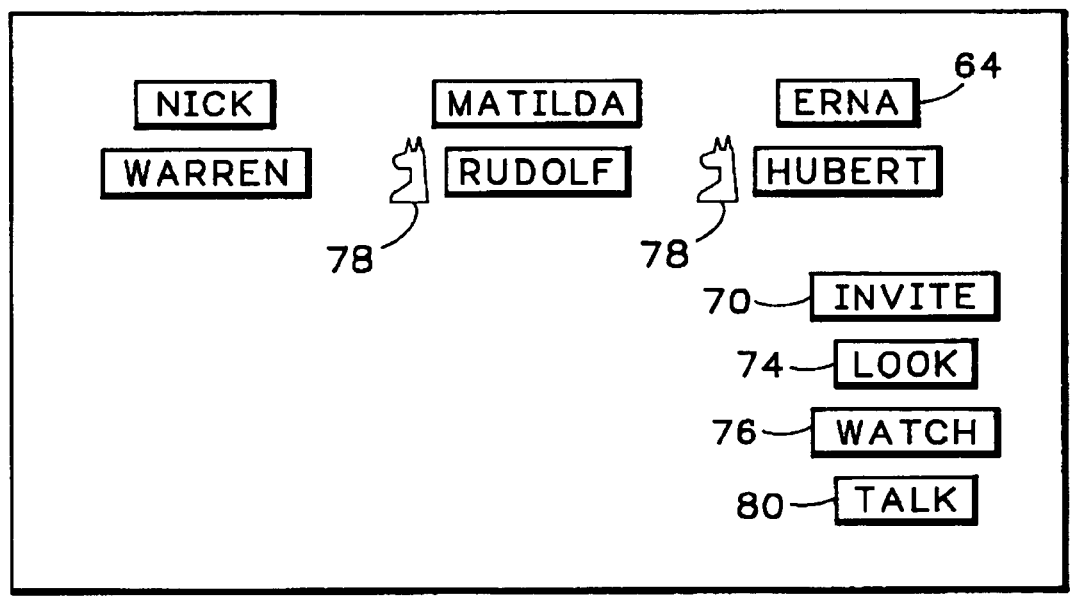

When the network is accessed, a display such as shown in FIG. 7 may be presented on the visual display of the first remote computer system. FIG. 7 includes a listing of different people who have also accessed the network, such as "ERNA" at 64. From this screen the user can select different functions.

To play a video game, the user must first select a second player as set forth in block 66 in FIG. 3. Then the user can invite the second player to play a video game as shown in block 68 in FIG. 3 and as represented by block 70 in FIG. 7. If the user invites a second player to play a game, the method outlined in FIG. 3 then allows the second player to access the visual representation and information of the first player, as shown at 72. In other words, the second player would see a screen displaying information about the first player similar to that shown in FIG. 6.

Another function that can be selected from the screen shown in FIG. 7 is to "LOOK" at information about others who have accessed the network, as represented by block 74 in FIG. 7. This function allows a first user to access information about any other user and to see a visual representation (whether realistic or not) of any other user.

Another function is to allow a user to interact with other users by watching a video game or application as it is played between the other users. That feature is represented by block 76 in FIG. 7. For example, an icon such as icons 78 can be positioned next to the names of those who have accessed the computer network. The icons indicate whether a person is playing a game and if so, what type of game. In FIG. 7, icons 78 represent chess and show that "RUDOLPH" and "HUBERT" are playing chess. By selecting block 76, a user can watch "RUDOLPH" and "HUBERT" play chess.

Expressed differently, the invented method of interacting employs one of the predetermined application programs such as a video game by at least two primary users, such as "RUDOLPH" and "HUBERT" in FIG. 7. The method allows a different user to watch the action of the predetermined application program as it is employed by the primary users. This is accomplished by monitoring the action of the application as it is transmitted through the central computer system.

Another function allows one user of the computer network to send a message to any number of other users of the computer network, as represented by block 80 in FIG. 7. Other features, such as an electronic bulletin board, also can be included.

In most applications, each remote computer system on the computer network would have the software required to create the visual representations, to indicate personal characteristics, to communicate with the central computer system and to run different applications programs such as computer games. That software could all be resident on one or more floppy disks or on a hard disk. The phrase "means for sending the visual representation of a user from one remote computer system to a predetermined number of other remote computer systems through the central computer system" includes software capable of achieving that function, and the phrase "means for running one of the application programs between users of different remote computer systems" includes software capable of achieving that function. When each remote computer system has its own independent software, each remote computer system, in essence, plays its own video game and the central computer system simply transmits the moves or plays from other remote computer systems.

As explained, the invented method of interfacing and interacting allows for point-to-point communication between different remote computer systems. In other words, the invented methods and network allow for communication between any number of remote computer systems.

INDUSTRIAL APPLICABILITY

The invented method of interfacing is applicable to computer networks. It is specifically applicable when users desire to see visual representations of other users. The invented method of interacting is applicable for networks where two or more users together run an application program such as a video game, and where a different user desires to watch the action of the application. The invented network is applicable to the computer industry and specifically to the video game industry. While the preferred embodiment and best mode of the invention have been disclosed, variations and changes may be made without departing from the spirit of the invention.

We claim:

1. A computer implemented method of creating a player profile for interacting on a computer network, the method comprising:
   displaying, on a first computer, an interface comprising a plurality of skill levels for video games, the video games including at least a first video game and a second video game;
   receiving, by the first computer, selections by a first user of a first one of the skill levels for the first video game and a second one of the skill levels for the second video game;
   storing, by the first computer, profile data of the first user for the plurality plurality of video games, the profile data reflecting the first skill level for the first video game and the second skill level for the second video game; and
   transmitting the profile data over the computer network for access by a second computer, the second computer being used for multiplayer gaming with the first computer, thereby providing a second user at the second computer with an indication of skill of the first user for the first video game relative to the second video game.

2. The method of claim 1 wherein displaying the interface comprises displaying the skill levels in terms of a normalized scale.

3. The method of claim 2 wherein displaying the skill levels in terms of the normalized scale comprises concurrently displaying, on the interface using the normalized scale, the first and second skill levels.

4. The method of claim 1 wherein the profile information is automatically rendered upon the first user inviting a second user to play a game.

5. The method of claim 1 wherein the profile information is automatically rendered upon the second user taking an action demonstrating an interest in the first user.

6. The method of claim 1, further comprising:
   receiving, by the first computer, selections by the first user of interest levels in the first and second identified video games; and
   updating the profile data of the first user to reflect the selected interest levels.

7. The method of claim 1 further comprising:
receiving, from the first user, a selection of a visage;
saving the visage in a memory device; and
providing the visage to the second computer.

8. The method of claim 1 further comprising:
receiving, from the first user, personal characteristics;
saving the personal characteristics in a memory device; and
providing the personal characteristics to the second computer.

9. The method of claim 8, wherein the personal characteristics reflect hobbies of the first user.

10. The method of claim 1 wherein the skill levels reflect gradations of skill.

11. The method of claim 10 wherein the gradations of skill include a level representing relatively little skill, a level representing relatively intermediate skill, and a level representing relatively great skill.

12. The method of claim 1 wherein the profile information is displayed to the second user upon the first user inviting the second user to play the game.

13. The method of claim 1 further comprising:
automatically rendering profile information of the second user, and
displaying the rendered profile information of the second user to the first user upon the first user inviting the second user to play the game,
wherein the rendered profile information of the second user reflects a skill level of the second user for the first video game relative to the second video game.

14. The method of claim 1 wherein the first video game is chess and the second video game is checkers.

15. A computer implemented method of accessing a player profile for interacting on a computer gaming network, the method comprising:
displaying to a first user, on a first computer, an interface that includes profile information of a second user for a plurality of video games, the profile information included in the interface reflecting a skill level of the second user for a first video game relative to a second video game, the first and second identified video games being among the plurality of video games; and
receiving, by the first computer, an input from the first user to initiate a game with the second user based on the profile information; and
transmitting, over the computer gaming network, a request to initiate the game with the second user.

16. The method of claim 15 wherein the profile information included in the interface includes the skill level reflected on a normalized scale.

17. The method of claim 15 wherein the profile information is automatically rendered upon the first user inviting the second user to play a game.

18. The method of claim 15 wherein the profile information is automatically rendered upon the second user taking an action demonstrating an interest in the first user.

19. The method of claim 15, further comprising displaying, on the first computer, an interest level of the second user with respect to one or more of the plurality of video games.

20. The method of claim 19, further comprising displaying, on the first computer, access an interest level of the second user with respect to the first video game.

21. The method of claim 15 further comprising displaying, on the first computer, a visage of the second user.

22. The method of claim 15 further comprising displaying, on the first computer, personal characteristics of the second user.

23. The method of claim 22 wherein the personal characteristics of the second user reflect hobbies of the second user.

24. The method of claim 15 wherein skill level is chosen from among gradations of skill.

25. The method of claim 24 wherein the gradations of skill include a level representing relatively little skill, a level representing relatively intermediate skill, and a level representing relatively great skill.

26. The method of claim 15 wherein the profile information is displayed to the first user upon the first user inviting the second user to play the game.

27. The method of claim 15 further comprising:
automatically rendering profile information of the first user, and
displaying the rendered profile information of the first user to the second user upon the first user inviting the second user to play the game,
wherein the rendered profile information enables user determination of a skill level of the first user for the first identified video game relative to the second identified video game.

28. A computer implemented method of creating a user profile for interacting on a computer network, the method comprising:
displaying, on a first computer, an interface comprising a plurality of levels of interest in one or more video games, the levels of interest including a level representing relatively little interest, a level representing relatively intermediate interest, and a level representing relatively great interest;
receiving, by the first computer, selections by a first user of the levels of interest in the one or more video games;
storing, by the first computer, first profile data for the one or more video games, the first profile data reflecting the selected levels of interest in the one or more video games;
receiving, by the first computer, personal interests of the first user;
storing, by the first computer, second profile data reflecting the personal interests of the first user;
displaying, on the first computer, an interface comprising a plurality of skill levels for the one or more video games, the skill levels including a level representing relatively little skill, a level representing relatively intermediate skill, and a level representing relatively great skill;
receiving, by the first computer, selections by the first user of the levels of skill for the one or more video games;
storing, by the first computer, third profile data for the one or more video games, the third profile data reflecting the selected levels of skill for the one or more video games; and
transmitting, by the first computer, the first profile data, the second profile data, and the third profile data over the computer network for access by a second computer, the second computer being used for multi-user communications with the first computer.

29. The method of claim 28 wherein:
the levels of interest are specified on a first normalized scale; and
the third profile data reflects the selected levels of skill for the one or more video games on a second normalized scale.

30. The method of claim 29 wherein the first normalized scale is the same as the second normalized scale, and further comprising concurrently displaying the selected levels of skill for at least a first one of the video games and a second one of the video games.

31. The method of claim 30 further comprising:
  displaying the second profile data and the third profile data within a single interface window, the single interface window including:
    a personal characteristics display area that includes a label identifying the personal characteristics display area and identifiers corresponding to each of the personal interests reflected by the second profile data, the identifiers being displayed in association with the label identifying the personal characteristics display area; and
    a video game display area that includes a video game identifier for each of the video games, a graphical skill indicator corresponding to each of the video game identifiers, and a graphical interest indicator corresponding to each of the video game identifiers, each graphical skill indicator being displayed, in association with the video game identifier for the corresponding video game, using the normalized scale and each graphical interest indicator being displayed, in association with the video game identifier for the corresponding video game, using the first normalized scale.

32. The method of claim 28, further comprising receiving, from the first user, selections of fourth profile data that is unrelated to video games, and storing the fourth profile data.

33. The method of claim 28 wherein the levels of interest reflect gradations of interest for each of the video games.

34. A computer-readable medium comprising instructions executable by a processor to perform a method comprising:
  displaying an interface comprising a plurality of levels of interest in one or more video games, the levels of interest including a level representing relatively little interest, a level representing relatively intermediate interest, and a level representing relatively great interest;
  receiving selections by a first user of the levels of interest in the one or more video games;
  storing, by a first computer, first profile data for the one or more video games, the first profile data reflecting the selected levels of interest in the one or more video games;
  receiving personal interests of the first user;
  storing, by the first computer, second profile data reflecting the personal interests of the first user;
  displaying an interface comprising a plurality of skill levels for the one or more video games, the skill levels including a level representing relatively little skill, a level representing relatively intermediate skill, and a level representing relatively great skill;
  receiving selections by the first user of the levels of skill for the one or more video games;
  storing, by the first computer, third profile data for the one or more video games, the third profile data reflecting the selected levels of skill for the one or more video games; and
  transmitting the first profile data, the second profile data, and the third profile data over the computer network for access by a second computer,
  the second computer being used for multi-user communications with the first computer.

35. The computer-readable medium system of claim 34 wherein:
  the levels of interest are specified on a first normalized scale; and
  the third profile data reflects the selected levels of skill for the one or more video games on second a normalized scale.

36. The computer-readable medium of claim 35 wherein the first normalized scale is the same as the second normalized scale, the method further comprising concurrently displaying the selected levels of skill for at least a first one of the video games and a second one of the video games.

37. The computer-readable medium system of claim 36, the method further comprising:
  displaying the second profile data and the third profile data within a single interface window, the single interface window including:
    a personal characteristics display area that includes a label identifying the personal characteristics display area and identifiers corresponding to each of the personal interests reflected by the second profile data, the identifiers being displayed in association with the label identifying the personal characteristics display area; and
    a video game display area that includes a video game identifier for each of the video games, a graphical skill indicator corresponding to each of the video game identifiers, and a graphical interest indicator corresponding to each of the video game identifiers, each graphical skill indicator being displayed, in association with the video game identifier for the corresponding video game, using the normalized scale and each graphical interest indicator being displayed, in association with the video game identifier for the corresponding video game, using the first normalized scale.

38. The computer-readable medium of claim 34 wherein the method further comprises receiving, from the first user, selections of fourth profile data that is unrelated to video games, and storing the fourth profile data.

* * * * *